US011869367B2

(12) United States Patent
Kim

(10) Patent No.: US 11,869,367 B2
(45) Date of Patent: Jan. 9, 2024

(54) DEVICE AND METHOD FOR CONTROLLING FLIGHT OF UNMANNED AERIAL VEHICLE

(71) Applicants: Hyundai Motor Company, Seoul (KR); Kia Corporation, Seoul (KR)

(72) Inventor: Hyun Soo Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 17/354,578

(22) Filed: Jun. 22, 2021

(65) Prior Publication Data

US 2022/0172627 A1 Jun. 2, 2022

(30) Foreign Application Priority Data

Nov. 30, 2020 (KR) ........................ 10-2020-0164972

(51) Int. Cl.
*G08G 5/00* (2006.01)
(52) U.S. Cl.
CPC ............. *G08G 5/003* (2013.01); *G08G 5/006* (2013.01); *G08G 5/0013* (2013.01); *G08G 5/0069* (2013.01)
(58) Field of Classification Search
CPC ...... G08G 5/003; G08G 5/0013; G08G 5/006; G08G 5/0069

USPC .............................................................. 701/3
See application file for complete search history.

(56) References Cited

U.S. PATENT DOCUMENTS

2019/0012636 A1* 1/2019 Simon .................... G08G 1/202
2019/0266901 A1* 8/2019 McHale ............... G01C 21/005

FOREIGN PATENT DOCUMENTS

KR 101670769 B1 10/2016

* cited by examiner

*Primary Examiner* — Isaac G Smith
(74) *Attorney, Agent, or Firm* — Fox Rothschild LLP

(57) ABSTRACT

A device and a method for controlling flight of an unmanned aerial vehicle are provided. To efficiently acquire environment information required to generate a navigation route of a vehicle, the device include a receiver that receives departure point information and destination information of a vehicle. A controller that generates a flight route corresponding to a travel route from a departure point to a destination of the vehicle based on at least one of a sensing range of a sensor mounted on the unmanned aerial vehicle, a flight available distance based on a fuel amount, and a communication available distance of a communication device mounted on the unmanned aerial vehicle, and operates the unmanned aerial vehicle to follow the generated flight route.

18 Claims, 5 Drawing Sheets

DEVICE AND METHOD FOR CONTROLLING FLIGHT OF UNMANNED AERIAL VEHICLE

CROSS-REFERENCE TO RELATED APPLICATION

This application claims the benefit of priority to Korean Patent Application No. 10-2020-0164972, filed in the Korean Intellectual Property Office on Nov. 30, 2020, the entire contents of which are incorporated herein by reference.

TECHNICAL FIELD

The present disclosure relates to a technology for controlling flight of an unmanned aerial vehicle based on a navigation route of a vehicle (a route from a departure point to a destination).

BACKGROUND

Recently, technologies for promoting safe travel of a vehicle by acquiring environment information on a route from a departure point of the vehicle (including an autonomous vehicle) to a destination from an unmanned aerial vehicle, creating a navigation route to which the acquired environment information is reflected, and providing the navigation route to the vehicle are being developed.

Such technologies have a problem of not being able to efficiently acquire the environment information because a performance (a sensing range) of a sensor applied to an unmanned aerial vehicle, a flight available distance based on a fuel amount (including a remaining amount of battery), and a performance (a distance at which communication with the vehicle is available) of a communication device are not considered in controlling flight of the unmanned aerial vehicle for acquiring the environment information on the route from the departure point to the destination of the vehicle.

The matters described in this background are written for enhancing an understanding of the background of the invention, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact. An aspect of the present disclosure provides a device and a method for controlling flight of an unmanned aerial vehicle that may efficiently acquire environment information required to create a navigation route of a vehicle by generating a flight route of the unmanned aerial vehicle corresponding to a travel route from a departure point to a destination of the vehicle based on a performance of a sensor mounted on the unmanned aerial vehicle, a flight available distance based on a fuel amount (a battery remaining capacity), and a performance of a communication device, and operating the unmanned aerial vehicle to follow the generated flight route.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling flight of an unmanned aerial vehicle may include a receiver configured to receive departure point information and destination information of a vehicle, and a controller configured to generate a flight route corresponding to a travel route from a departure point to a destination of the vehicle based on at least one of a sensing range of a sensor mounted on the unmanned aerial vehicle, a flight available distance based on a fuel amount, and/or a communication available distance of a communication device mounted on the unmanned aerial vehicle, and operate the unmanned aerial vehicle to follow the generated flight route.

In one implementation, the controller may be configured to detect a center point on a straight line connecting the departure point and the destination with each other, detect a first point on the travel route located farthest from the center point, and detect a sensing region having a straight line connecting the center point and the first point with each other as a radius. In one implementation, the controller may be configured to generate a first flight route for flying in a direction of the straight line from the departure point to the center point when the sensing region is contained in a reference region.

In one implementation, the controller may be configured to operate the unmanned aerial vehicle to wait at the center point until the vehicle arrives at the destination when the unmanned aerial vehicle arrives at the center point along the first flight route. In one implementation, the controller may be configured to operate the unmanned aerial vehicle to only fly from the departure point to a maximum reach point along the first flight route when the first flight route exceeds a reference distance.

In one implementation, the controller may be configured to calculate a total distance required to return to a specified place after flying along the first flight route from the departure point as the flight available distance. In one implementation, the controller may be configured to generate a second flight route for flying along the travel route when the sensing region is not contained in a reference region. In one implementation, the controller may be configured to operate the unmanned aerial vehicle to follow the second flight route while maintaining a spaced distance from the vehicle within the communication available distance.

In addition, the controller may be configured to operate the unmanned aerial vehicle to fly only from the departure point to a maximum reach point along the second flight route when the second flight route exceeds a reference distance. The controller may be configured to operate the unmanned aerial vehicle to fly only from the departure point to a maximum reach point along the second flight route while maintaining a spaced distance from the vehicle within the communication available distance when the second flight route exceeds a reference distance.

According to another aspect of the present disclosure, a method for controlling flight of an unmanned aerial vehicle may include receiving, by a receiver, departure point information and destination information of a vehicle, generating, by a controller, a flight route corresponding to a travel route from a departure point to a destination of the vehicle based on at least one of a sensing range of a sensor mounted on the unmanned aerial vehicle, a flight available distance based on a fuel amount, and/or a communication available distance of a communication device mounted on the unmanned aerial vehicle, and operating, by the controller, the unmanned aerial vehicle to follow the created flight route.

In one implementation, the generating of the flight route may include detecting a center point on a straight line connecting the departure point and the destination with each other, detecting a first point on the travel route located farthest from the center point, and detecting a sensing region having a straight line connecting the center point and the first point with each other as a radius. In addition, the generating of the flight route may further include creating a first flight route for flying in a direction of the straight line from the departure point to the center point when the sensing region is contained in a reference region.

In one implementation, the operating of the unmanned aerial vehicle may include making the unmanned aerial vehicle wait at the center point until the vehicle arrives at the destination when the unmanned aerial vehicle arrives at the center point along the first flight route. The operating of the unmanned aerial vehicle may include operating the unmanned aerial vehicle to only fly from the departure point to a maximum reach point along the first flight route when the first flight route exceeds a reference distance.

In addition, the generating of the flight route may include calculating a total distance required to return to a specified place after flying along the first flight route from the departure point as the flight available distance. In one implementation, the generating of the flight route may further include generating a second flight route for flying along the travel route when the sensing region is not contained in a reference region. The operating of the unmanned aerial vehicle may include operating the unmanned aerial vehicle to follow the second flight route while maintaining a spaced distance from the vehicle within the communication available distance.

In one implementation, the operating of the unmanned aerial vehicle may include operating the unmanned aerial vehicle to fly only from the departure point to a maximum reach point along the second flight route when the second flight route exceeds a reference distance. In addition, the operating of the unmanned aerial vehicle may include operating the unmanned aerial vehicle to fly only from the departure point to a maximum reach point along the second flight route while maintaining a spaced distance from the vehicle within the communication available distance when the second flight route exceeds a reference distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
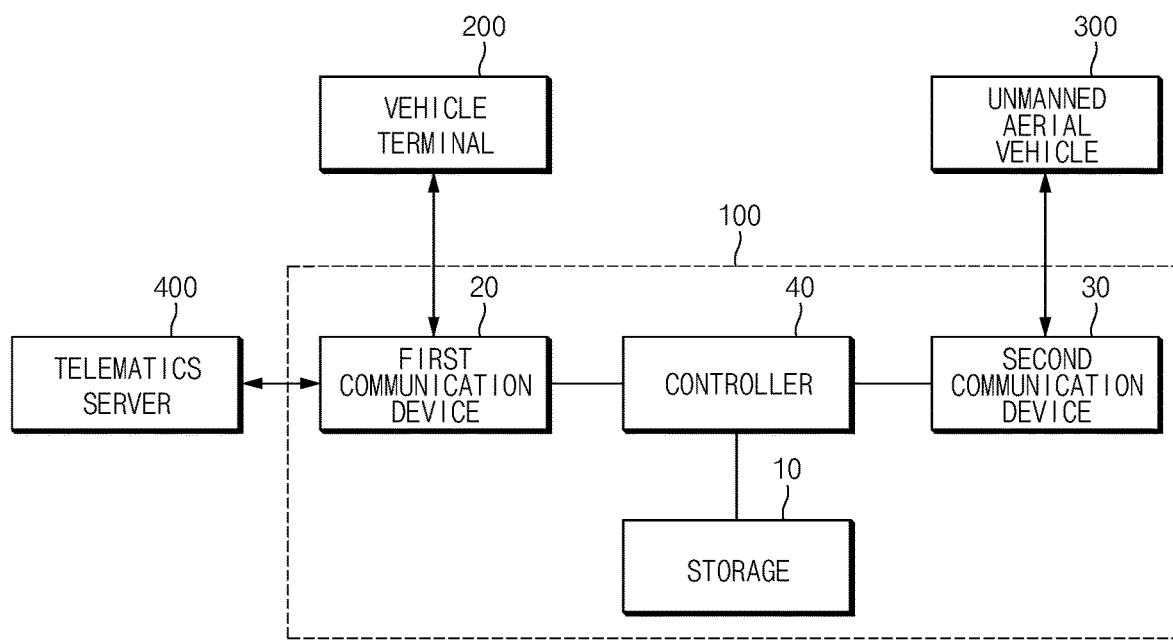
FIG. 1 is a block diagram of a device for controlling flight of an unmanned aerial vehicle according to an exemplary embodiment of the present disclosure.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a device for controlling flight of an unmanned aerial vehicle according to an exemplary embodiment of the present disclosure. As shown in FIG. 1, a device 100 for controlling flight of an unmanned aerial vehicle according to an exemplary embodiment of the present disclosure may include storage 10, a first communication device 20, a second communication device 30, and a controller 40. In this connection, components may be coupled to each other to be implemented as one component, or some components may be omitted depending on a scheme for implementing the device 100 for controlling the flight of the unmanned aerial vehicle according to an exemplary embodiment of the present disclosure. In particular, the first communication device 20 and the second communication device 30 may be integrated into one module.

Each of the components will be described. First, the storage 10 may be configured to store various logics, algorithms, and programs required in a process of generating a flight route of an unmanned aerial vehicle 300 corresponding to a route from a departure point to a destination of a vehicle based on a performance of a sensor mounted on the unmanned aerial vehicle 300, a flight available distance based on a fuel amount (a battery remaining capacity), and a performance of a communication device, and operating the unmanned aerial vehicle 300 to follow the generated flight route. In this connection, the sensor may include at least one of a GPS, a camera, a radar, and/or a lidar.

The storage 10 may include at least one type of recording media (storage media) of a memory of a flash memory type, a hard disk type, a micro type, a card type (e.g., a secure digital card (SD card) or an eXtream digital card (XD card)), and the like, and/or a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The first communication device 20, which is a module that provides an interface for communication with a vehicle terminal 200, may be configured to receive departure point information and destination information from the vehicle terminal 200, and transmit environment information on the route from the departure point to the destination of the vehicle to the vehicle terminal 200. In this connection, the environment information may include traffic information (accident information, traffic information, and the like), road information (road control information, construction information, toll information, and the like), and weather information (snow, rain, and the like).

In addition, the first communication device 20, which is a module that provides an interface for communication with a telematics server 400, may be configured to receive the departure point information and the destination information from the telematics server 400. In one example, the first communication device 20 may be configured to receive a travel route corresponding to the departure point information and the destination information of the vehicle from the telematics server 400. The first communication device 20 may include at least one of a mobile communication module, a wireless Internet module, and/or a short-range communication module as a data transmission/reception module.

The mobile communication module may be configured to communicate with the vehicle terminal 200 via a mobile communication network built based on technical standards or communication schemes for mobile communication (e.g., a global system for mobile communication (GSM), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTEA), a 4th generation mobile telecommunication (4G), a 5th generation mobile telecommunication (5G), and the like).

The wireless Internet module, which is a module for wireless Internet access, may be configured to communicate with the vehicle terminal 200 via a wireless LAN (WLAN), a wireless-fidelity (Wi-Fi), a wireless fidelity (Wi-Fi) Direct, a digital living network alliance (DLNA), a wireless broadband (WiBro), a world interoperability for microwave access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of technologies of a Bluetooth™, a radio frequency identification (RFID), an infrared data association (IrDA), an ultra wideband (UWB), a ZigBee, a near field communication (NFC), and/or a wireless universal serial bus (Wireless USB).

The second communication device 30, which is a module that provides an interface for communication with the unmanned aerial vehicle 300, may be configured to receive sensor information (a sensing range of the sensor), fuel amount information (battery remaining capacity information), and communication device information (a communication available distance of the communication device) from the unmanned aerial vehicle 300, and transmit the flight route of the unmanned aerial vehicle 300 corresponding to the route from the departure point to the destination of the vehicle to the unmanned aerial vehicle 300. In this connection, the communication available distance of the communication device refers to a distance in which both a specification aspect and an environmental aspect (a transmission/reception sensitivity) of the communication device are considered.

The second communication device 30 may include the short-range communication module as the data transmission/reception module. The short-range communication module may support short-range communication using at least one of technologies of a Bluetooth™, a radio frequency identification (RFID), an infrared communication (an infrared data association; IrDA), an ultra wideband (UWB), a ZigBee, a near field communication (NFC), and/or a wireless Universal Serial BUS (USB). In this connection, the second communication device 30 may be configured to communicate with the unmanned aerial vehicle 300 using LTE and 5G communication schemes.

The controller 40 may be configured to perform overall control such that each of the components may normally perform a function thereof. The controller 40 may be implemented in a form of hardware, software, or a combination of the hardware and the software. In particular, the controller 40 may be implemented as a microprocessor, but may not be limited thereto. The controller 40 may be configured to perform various controls in the process of generating the flight route of the unmanned aerial vehicle 300 corresponding to the route from the departure point to the destination of the vehicle in consideration of the performance of the sensor mounted on the unmanned aerial vehicle 300, the flight available distance based on the fuel amount (the battery remaining capacity), and the performance of the communication device, and operating the unmanned aerial vehicle 300 to follow the generated flight route.

Figure 2:
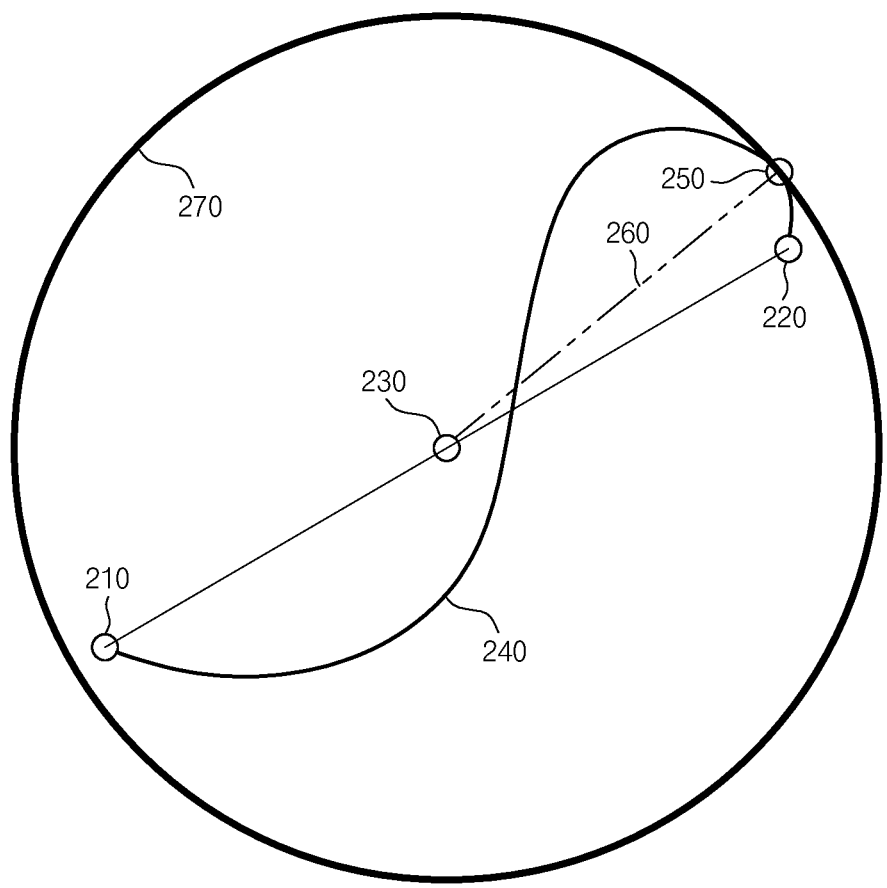
FIG. 2 is an exemplary diagram illustrating a sensing region detected by a controller equipped in a device for controlling flight of an unmanned aerial vehicle according to an exemplary embodiment of the present disclosure.

Hereinafter, an operation of the controller 40 will be described in detail with reference to FIGS. 2 to 5. FIG. 2 is an exemplary diagram illustrating a sensing region detected by a controller equipped in a device for controlling flight of an unmanned aerial vehicle according to an exemplary embodiment of the present disclosure.

In FIG. 2, '210' represents the departure point (or a current location) of the vehicle, '220' represents the destination, '230' represents a center point of a straight line connecting the departure point 210 and the destination 220 with each other, '240' represents a travel route of the vehicle from the departure point 210 to the destination 220, '250' represents a point on the route 240 located farthest from the center point 230, '260' represents a straight line (a sensing radius) connecting the center point 230 and the point 250 with each other, and '270' represents a circle (a sensing region) formed by the sensing radius 260.

The controller 40 may be configured to generate the straight line connecting the departure point 210 and the destination 220 with each other, detect the center point 230 of the straight line, detect the point 250 on the travel route 240 located farthest from the center point 230 on the travel route 240 from the departure point 210 to the destination 220, and detect the sensing region 270 having the radius 260 of the straight line connecting the center point 230 and the point 250 with each other.

Figure 3:
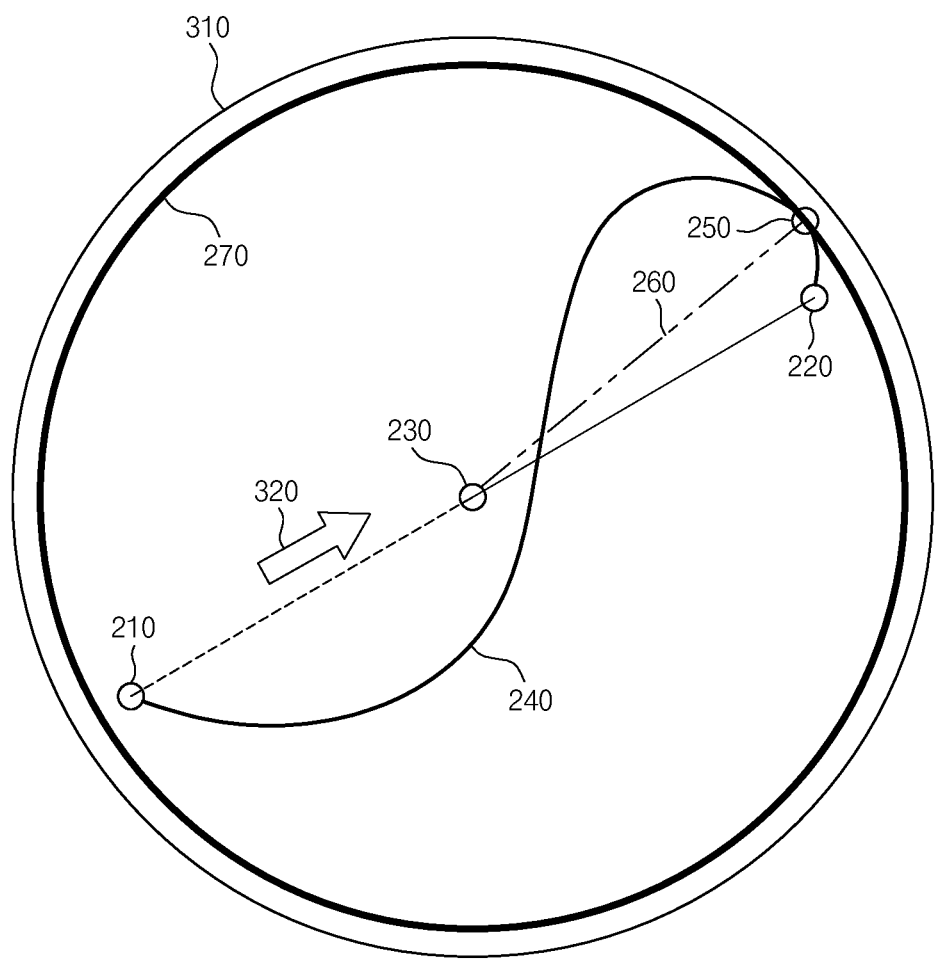
FIG. 3 is an exemplary diagram illustrating a flight route of an unmanned aerial vehicle generated by a controller equipped in a device for controlling flight of the unmanned aerial vehicle according to an exemplary embodiment of the present disclosure.

FIG. 3 is an exemplary diagram illustrating a flight route of an unmanned aerial vehicle generated by a controller equipped in a device for controlling flight of the unmanned aerial vehicle according to an exemplary embodiment of the present disclosure.

As shown in FIG. 3, the controller 40 equipped in the device for controlling the flight of the unmanned aerial vehicle according to an exemplary embodiment of the present disclosure may be configured to generate a flight route 320 flying in a direction of the straight line from the departure point 210 to the center point 230 of the sensing region 270 when the sensing region 270 corresponding to the travel route 240 from the departure point 210 to the destination 220 is contained in a reference region 310 (when the radius of the sensing region 270 is equal to or less than a radius of the reference region 310). In this connection, the reference region 310 may represent a maximum sensing region of the sensor disposed on the unmanned aerial vehicle 300, and the reference region 310 may be determined based on the performance of the sensor disposed on the unmanned aerial vehicle 300.

Thereafter, when the unmanned aerial vehicle 300 flies along the flight route 320 and arrives at the center point 230, the controller 40 may be configured to operate the unmanned aerial vehicle 300 to wait at the center point 230 until the vehicle arrives at the destination 220 without immediately returning the unmanned aerial vehicle 300 to a specified place (e.g., a nearby charging station, a waiting station, and the like). In other words, when the vehicle arrives at the destination 220, the controller 40 may be configured to return the unmanned aerial vehicle 300, which is in circular flight at the center point 230, to the specified place.

In addition, the controller 40 may be configured to generate the flight route of the unmanned aerial vehicle 300 by further considering the flight available distance based on the fuel amount of the unmanned aerial vehicle 300. In this connection, the flight available distance based on the fuel amount of the unmanned aerial vehicle 300 refers to a total distance required to return to the specified place after flying along the flight route 320 from the departure point 210. The flight available distance may be calculated by the controller 40.

For example, the controller 40 may be configured to maintain the flight route 320 when the flight route 320 of the unmanned aerial vehicle 300 is less than a reference distance, and may be configured to generate a new flight route for only traveling from the departure point 210 to a maximum reach point along the flight route 320 when the flight route 320 of the unmanned aerial vehicle 300 exceeds the reference distance. In this connection, the reference distance refers to a distance obtained by subtracting a return distance from the flight available distance based on the fuel amount of the unmanned aerial vehicle 300, and the maximum reach point means a point at which the unmanned aerial vehicle 300 must change a direction thereof to the return place because of a residual fuel amount after flying along the flight route 320 from the departure point 210.

As another example, when the flight route 320 of the unmanned aerial vehicle 300 exceeds the reference distance, the controller 40 may be configured to generate a flight route from the departure point 210 to an arbitrary point located between the departure point 210 and the maximum reach point. This is because it may be more advantageous for the unmanned aerial vehicle 300 to fly only to the arbitrary point ahead of the maximum reach point in terms of fuel consumption and information provision to the vehicle rather than to fly to the maximum reach point.

In addition, the controller 40 may also be configured to generate the flight route of the unmanned aerial vehicle 300 by further considering the flight available distance based on the fuel amount of the unmanned aerial vehicle 300 and the performance (the communication available distance) of the communication device equipped in the unmanned aerial vehicle 300. For example, the controller 40 may be configured to operate the unmanned aerial vehicle 300 to follow the flight route 320 while maintaining a spaced distance from the vehicle within the communication available distance when the flight route 320 of the unmanned aerial vehicle 300 is less than the reference distance, and operate the unmanned aerial vehicle 300 to fly only to the maximum reach point along the flight route 320 from the departure point 210 while maintaining the spaced distance from the vehicle within the communication available distance when the flight route 320 of the unmanned aerial vehicle 300 exceeds the reference distance.

Figure 4:
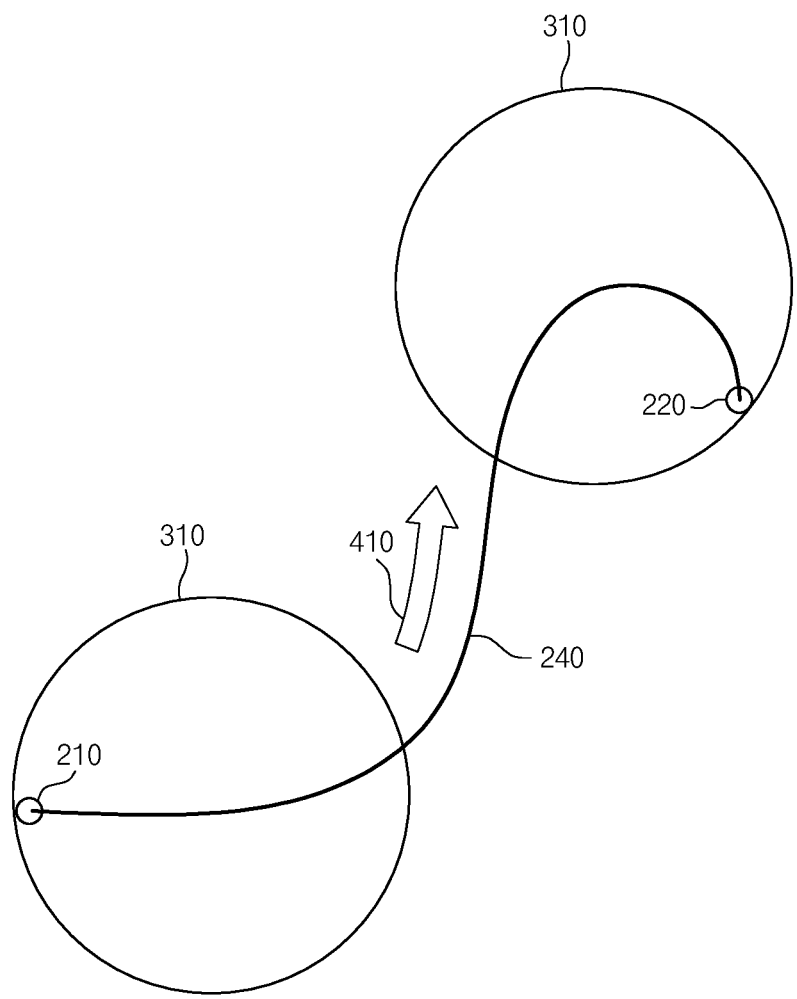
FIG. 4 is another exemplary diagram illustrating a flight route of an unmanned aerial vehicle generated by a controller equipped in a device for controlling flight of an unmanned aerial vehicle according to an exemplary embodiment of the present disclosure.

FIG. 4 is another exemplary diagram illustrating a flight route of an unmanned aerial vehicle generated by a controller equipped in a device for controlling flight of an unmanned aerial vehicle according to an embodiment of the present disclosure. As shown in FIG. 4, in response to determining that the sensing region 270 corresponding to the travel route 240 from the departure point 210 to the destination 220 exceeds the reference region 310, the controller 40 equipped in the device for controlling the flight of the unmanned aerial vehicle according to an exemplary embodiment of the present disclosure may be configured to generate a flight route 410 for flying along the travel route 240 from the departure point 210 to the destination 220.

Thereafter, when the unmanned aerial vehicle 300 flies along the flight route 410 and arrives at the destination 220, the controller 40 may be configured to operate the unmanned aerial vehicle 300 to wait at the destination 220 until the vehicle arrives at the destination 220 without immediately returning the unmanned aerial vehicle 300 to the specified place (e.g., the nearby charging station, the waiting station, and the like). In other words, when the vehicle arrives at the destination 220, the controller 40 may be configured to return the unmanned aerial vehicle 300, which is in the circular flight at the destination 220, to the specified place.

In addition, the controller 40 may be configured to generate the flight route of the unmanned aerial vehicle 300 by further considering the flight available distance based on the fuel amount of the unmanned aerial vehicle 300. In this connection, the flight available distance of the unmanned aerial vehicle 300 refers to a distance required to return to the specified place after flying along the flight route 410 from the departure point 210. The flight available distance may be calculated by the controller 40.

For example, the controller 40 may be configured to maintain the flight route 410 in response to determining that the flight route 410 of the unmanned aerial vehicle 300 is less than the reference distance, and generate a new flight route for only traveling from the departure point 210 to the maximum reach point along the flight route 410 in response to determining that the flight route 410 of the unmanned aerial vehicle 300 exceeds the reference distance. In this connection, the reference distance refers to the distance obtained by subtracting the return distance from the flight available distance based on the fuel amount of the unmanned aerial vehicle 300, and the maximum reach point refers to a point at which the unmanned aerial vehicle 300 must change the direction thereof to the return place because of a residual fuel amount after flying along the flight route 410 from the departure point 210.

As another example, when the flight route 410 of the unmanned aerial vehicle 300 exceeds the reference distance, the controller 40 may be configured to generate a flight route for flying from the departure point 210 to an arbitrary point located between the departure point 210 and the maximum reach point. This is because it may be more advantageous for the unmanned aerial vehicle 300 to fly only to the arbitrary point ahead of the maximum reach point in terms of the fuel consumption and the information provision to the vehicle rather than to fly to the maximum reach point.

In addition, the controller 40 may also be configured to generate the flight route of the unmanned aerial vehicle 300 by further considering the flight available distance based on the fuel amount of the unmanned aerial vehicle 300 and the performance (the communication available distance) of the communication device equipped in the unmanned aerial vehicle 300. For example, the controller 40 may be configured to operate the unmanned aerial vehicle 300 to follow the flight route 410 while maintaining the spaced distance from the vehicle within the communication available distance when the flight route 410 of the unmanned aerial vehicle 300 is less than the reference distance, and operate the unmanned aerial vehicle 300 to fly only to the maximum reach point along the flight route 410 from the departure point 210 while maintaining the spaced distance from the vehicle within the communication available distance when the flight route 410 of the unmanned aerial vehicle 300 exceeds the reference distance.

The device 100 for controlling the flight of the unmanned aerial vehicle according to an exemplary embodiment of the present disclosure may be mounted on the telematics server 400 or on the unmanned aerial vehicle 300. In this connection, the device 100 may be configured to generate the flight route of the unmanned aerial vehicle 300 in conjunction with the vehicle terminal 200 when being mounted on the telematics server 400, and may be configured to control the flight of the unmanned aerial vehicle 300 in conjunction with the vehicle terminal 200 when being mounted on the unmanned aerial vehicle 300.

Figure 5:
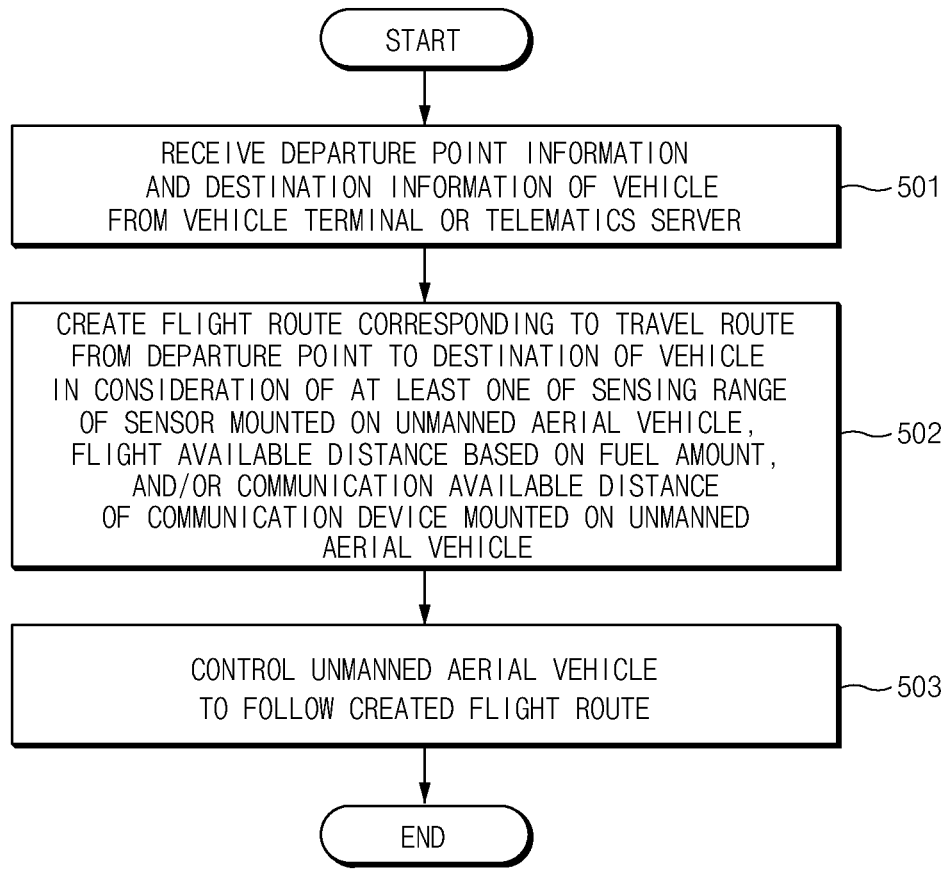
FIG. 5 is a flowchart of a method for controlling flight of an unmanned aerial vehicle according to an exemplary embodiment of the present disclosure.

FIG. 5 is a flowchart of a method for controlling flight of an unmanned aerial vehicle according to an exemplary embodiment of the present disclosure. First, the first communication device 20 may be configured to receive the departure point information and the destination information of the vehicle from the vehicle terminal 200 or the telematics server 400 (501). Thereafter, the controller 40 may be configured to generate the flight route corresponding to the travel route from the departure point to the destination of the vehicle in consideration of at least one of the sensing range of the sensor mounted on the unmanned aerial vehicle, the flight available distance based on the fuel amount, and/or the communication available distance of the communication device mounted on the unmanned aerial vehicle (502). Thereafter, the controller 40 may be configured to operate the unmanned aerial vehicle to follow the created flight route (503).

The description above is merely illustrative of the technical idea of the present disclosure, and various modifications and changes may be made by those skilled in the art without departing from the essential characteristics of the present disclosure.

Therefore, the exemplary embodiments disclosed in the present disclosure are not intended to limit the technical idea of the present disclosure but to illustrate the present disclosure, and the scope of the technical idea of the present disclosure is not limited by the exemplary embodiments. The scope of the present disclosure should be construed as being covered by the scope of the appended claims, and all technical ideas falling within the scope of the claims should be construed as being included in the scope of the present disclosure.

The device and the method for controlling the flight of the unmanned aerial vehicle according to an exemplary embodiment of the present disclosure as described above may efficiently acquire the environment information required to create the navigation route of the vehicle by generating the flight route of the unmanned aerial vehicle corresponding to the travel route from the departure point to the destination of the vehicle in consideration of the performance of the sensor mounted on the unmanned aerial vehicle, the flight available distance based on the fuel amount (the battery remaining capacity), and the performance of the communication device, and operating the unmanned aerial vehicle to follow the generated flight route.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling flight of an unmanned aerial vehicle, comprising:

a receiver configured to receive departure point information and destination information of a vehicle; and a controller configured to:
- generate a flight route corresponding to a travel route from a departure point to a destination of the vehicle based on at least one of a sensing range of a sensor mounted on the unmanned aerial vehicle, a flight available distance based on a fuel amount, and a communication available distance of a communication device mounted on the unmanned aerial vehicle;
- operate the unmanned aerial vehicle to follow the generated flight route;
- detect a center point on a straight line connecting the departure point and the destination with each other;
- detect a first point on the travel route located farthest from the center point; and
- detect a sensing region having a straight line connecting the center point and the first point with each other as a radius.

2. The device of claim 1, wherein the controller is configured to generate a first flight route for flying in a direction of the straight line from the departure point to the center point when the sensing region is contained in a reference region.

3. The device of claim 2, wherein the controller is configured to operate the unmanned aerial vehicle to wait at the center point until the vehicle arrives at the destination when the unmanned aerial vehicle arrives at the center point along the first flight route.

4. The device of claim 2, wherein the controller is configured to operate the unmanned aerial vehicle to only fly from the departure point to a maximum reach point along the first flight route when the first flight route exceeds a reference distance.

5. The device of claim 1, wherein the controller is configured to calculate a total distance required to return to a specified place after flying along the first flight route from the departure point as the flight available distance.

6. The device of claim 1, wherein the controller is configured to generate a second flight route for flying along the travel route when the sensing region is not contained in a reference region.

7. The device of claim 6, wherein the controller is configured to operate the unmanned aerial vehicle to follow the second flight route while maintaining a spaced distance from the vehicle within the communication available distance.

8. The device of claim 6, wherein the controller is configured to operate the unmanned aerial vehicle to fly only from the departure point to a maximum reach point along the second flight route in response to determining that the second flight route exceeds a reference distance.

9. The device of claim 6, wherein the controller is configured to operate the unmanned aerial vehicle to fly only from the departure point to a maximum reach point along the second flight route while maintaining a spaced distance from the vehicle within the communication available distance in response to determining that the second flight route exceeds a reference distance.

10. A method for controlling flight of an unmanned aerial vehicle, comprising:
- receiving, by a receiver, departure point information and destination information of a vehicle;
- generating, by a controller, a flight route corresponding to a travel route from a departure point to a destination of the vehicle based on at least one of a sensing range of a sensor mounted on the unmanned aerial vehicle, a flight available distance based on a fuel amount, and a communication available distance of a communication device mounted on the unmanned aerial vehicle; and
- operating, by the controller, the unmanned aerial vehicle to follow the generated flight route, wherein the generating of the flight route includes:
- detecting a center point on a straight line connecting the departure point and the destination with each other;
- detecting a first point on the travel route located farthest from the center point; and
- detecting a sensing region having a straight line connecting the center point and the first point with each other as a radius.

11. The method of claim 10, wherein the generating of the flight route further includes:
- generating a first flight route for flying in a direction of the straight line from the departure point to the center point when the sensing region is contained in a reference region.

12. The method of claim 11, wherein the operating of the unmanned aerial vehicle includes:
- operating the unmanned aerial vehicle to wait at the center point until the vehicle arrives at the destination when the unmanned aerial vehicle arrives at the center point along the first flight route.

13. The method of claim 11, wherein the operating of the unmanned aerial vehicle includes:
- operating the unmanned aerial vehicle to only fly from the departure point to a maximum reach point along the first flight route in response to determining that the first flight route exceeds a reference distance.

14. The method of claim 10, wherein the generating of the flight route includes:
- calculating a total distance required to return to a specified place after flying along the first flight route from the departure point as the flight available distance.

15. The method of claim 10, wherein the generating of the flight route further includes:
- generating a second flight route for flying along the travel route when the sensing region is not contained in a reference region.

16. The method of claim 15, wherein the operating of the unmanned aerial vehicle includes:
- operating the unmanned aerial vehicle to follow the second flight route while maintaining a spaced distance from the vehicle within the communication available distance.

17. The method of claim 15, wherein the operating of the unmanned aerial vehicle includes:
- operating the unmanned aerial vehicle to fly only from the departure point to a maximum reach point along the second flight route in response to determining that the second flight route exceeds a reference distance.

18. The method of claim 15, wherein the operating of the unmanned aerial vehicle includes:
- operating the unmanned aerial vehicle to fly only from the departure point to a maximum reach point along the second flight route while maintaining a spaced distance from the vehicle within the communication available distance in response to determining that the second flight route exceeds a reference distance.

* * * * *